(12) United States Patent
Harada (10) Patent No.: US 8,474,565 B2
(45) Date of Patent: Jul. 2, 2013

(54) SADDLE TYPE VEHICLE

(75) Inventor: Hiroyuki Harada, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 0 days.

(21) Appl. No.: 13/424,464

(22) Filed: Mar. 20, 2012

(65) Prior Publication Data

US 2012/0248733 A1    Oct. 4, 2012

(30) Foreign Application Priority Data

Mar. 31, 2011   (JP) .................................. 2011-079458

(51) Int. Cl.
   *B62J 9/00*   (2006.01)

(52) U.S. Cl.
   USPC ....................................... 180/219; 280/288.4

(58) Field of Classification Search
   USPC .......................... 180/218, 219, 220; 280/288.4
   See application file for complete search history.

(56) References Cited

U.S. PATENT DOCUMENTS

| | | | |
|---|---|---|---|
| 3,604,671 A * | 9/1971 | Walker | 248/309.1 |
| 3,837,545 A * | 9/1974 | Rogers, Jr. | 224/446 |
| 3,896,643 A * | 7/1975 | Kawakami | 70/59 |
| 3,987,495 A * | 10/1976 | Holley | 2/410 |
| 5,331,364 A * | 7/1994 | Borden | 396/632 |
| 5,884,825 A * | 3/1999 | Schroeder | 224/413 |
| 6,116,064 A * | 9/2000 | Driscoll | 70/59 |
| 2003/0173386 A1* | 9/2003 | Scaccia | 224/413 |
| 2003/0226383 A1* | 12/2003 | Kulas | 70/59 |
| 2010/0084446 A1* | 4/2010 | Skillern et al. | 224/275 |

FOREIGN PATENT DOCUMENTS

| | | |
|---|---|---|
| JP | 8-40336 A | 2/1996 |
| JP | 11-049062 | 2/1999 |

OTHER PUBLICATIONS

European Search Report, dated May 15, 2012, which issued during the prosecution of European Patent Application No. 12159197.8.

* cited by examiner

*Primary Examiner* — Tony Winner
(74) *Attorney, Agent, or Firm* — Troutman Sanders LLP (57) ABSTRACT

A saddle type vehicle includes: a seating seat on which a passenger is allowed to be seated; a seat rail to which the seating seat is allowed to be attachably and detachably attached; a frame cover covering outer sides of the seat rail; a helmet holder provided on the seat rail; and a restriction part provided in the vicinity of the helmet holder on the seat rail and projecting toward an inner peripheral surface of the frame cover, in which the helmet holder includes: a hooking portion on which a hook ring of a helmet is allowed to be hooked; and a guide portion extending from the hooking portion, and the restriction part is provided in the middle, of the guide portion, in a longitudinal direction.

11 Claims, 9 Drawing Sheets

SADDLE TYPE VEHICLE

CROSS-REFERENCE TO RELATED APPLICATIONS

This application is based upon and claims the benefit of priority of the prior Japanese Patent Application No. 2011-079458, filed on Mar. 31, 2011, the entire contents of which are incorporated herein by reference.

BACKGROUND OF THE INVENTION

1. Field of the Invention

The present invention relates to a saddle type vehicle. More specifically, the present invention is a saddle type vehicle such as a motorcycle, a motorized bicycle, or a handle bar type electric wheelchair (what is called a mobility scooter), and relates to a saddle type vehicle provided with a helmet holder capable of hooking and holding a helmet.

2. Description of the Related Art

In a saddle type vehicle such as a motorcycle or a motorized bicycle, a helmet holder on which a helmet is hooked and held is sometimes provided. Not using a helmet, a driver can hold the helmet on a helmet holder. As a result, theft of the helmet can be prevented.

As a conventional example of the helmet holder, as described in Patent Document 1, for example, there is a structure in which a helmet stopping hook is provided on an upper side of a vehicle body frame, and a cushion material is provided on a lower surface of a driving seat. According to such a structure, when the driving seat is attached to the upper side of the vehicle body frame, the cushion material abuts on an upper side of the helmet stopping hook, and thus a space between the helmet stopping hook and a lower portion of the driving seat disappears. Thus, it is possible to prevent a hook ring of a helmet from coming off from the helmet stopping hook, and it is possible to prevent theft or the like of the helmet hooked and held on the helmet holder.

[Patent Document 1] Japanese Laid-open Patent Publication No. 08-40336

However, in the structure described in Patent Document 1, there is a risk that when the driving seat is pulled up and a frame cover is strongly pressed to be bent, a space is thereby formed between the helmet stopping hook and a bottom portion of the driving seat and the helmet is pulled out therethrough. Particularly, if the frame cover is structured to be formed by being divided into frame covers, the frame cover is easily bent. In order to solve such problems and use the divided frame covers, deformation of the frame cover is required to be suppressed at a place where the driving seat and the helmet stopping hook come into contact with each other. Consequently, it is necessary to increase the thickness of the frame cover or to additional form a rib or the like to increase rigidity of the frame cover. In that case, there is a risk that a reduction in productivity due to an increase in weight and complication of the shape or structure is caused. Further, in a structure of an integrally molded frame cover being used, the size of a molding mold used for molding the frame cover, is increased, and thus there is a risk that productivity is reduced. Further, there is a problem that the degree of freedom of a design of the frame cover is reduced.

SUMMARY OF THE INVENTION

In order to solve the above-described problems, the present invention is to provide a saddle type vehicle capable of preventing a hook ring of a helmet from coming off from a helmet holder. Particularly, the present invention is to provide a saddle type vehicle capable of preventing deformation of a frame cover to prevent a space allowing the hook ring of the helmet to be pulled out therethrough from being made between the frame cover and a seating seat.

In order to solve the above-described problems, the present invention includes: a vehicle body frame; a frame cover provided on an outer side of the vehicle body frame; a hook part that is provided on the vehicle body frame and on which a hook ring provided on a helmet is allowed to be hooked and held; and a restriction part provided in the vicinity of the hook part on the vehicle body frame and projecting toward an inner peripheral surface of the frame cover to restrict deformation of the frame cover.

It is characterized in that one end of the hook part is fixed to the vehicle body frame and the other end of the hook part is separated from the vehicle body frame, and the restriction part is provided at an intermediate position between the one end and the other end of the hook part.

It is characterized in that the frame cover is formed of a plurality of separable and connectable cover members, and the restriction part is provided in the vicinity of a coupled portion of the cover members connected to each other.

It is characterized in that the hook part includes: a hooking portion on which the hook ring is allowed to be hooked and held; and a substantially bar-shaped guide portion that extends from the hooking portion and is capable of being inserted into the hook ring, and the restriction part is provided at an intermediate position, of the guide portion, in a longitudinal direction.

It is characterized in that the hook part and the restriction part are formed integrally by a metal wire material or metal bar material to be provided on the vehicle body frame.

It is characterized in that a space is formed between a tip of the restriction part and the inner peripheral surface of the frame cover.

It is characterized in that a cushion material is provided on a tip of the restriction part.

DETAILED DESCRIPTION OF THE PREFERRED EMBODIMENTS

Hereinafter, an embodiment of the present invention will be explained in detail with reference to the drawings. In the embodiment of the present invention, a structure to which a motorcycle is applied as a saddle type vehicle will be described. For convenience of explanation, a motorcycle according to the embodiment of the present invention is referred to as a "main motorcycle 1," and a helmet holder applied to the main motorcycle 1 is referred to as a "main helmet holder 8." Further, respective "front," "rear," "right," "left," "up," and "down" directions of the main motorcycle 1 and the main helmet holder 8 are on the basis of the direction of a driver to ride on the main motorcycle 1. In each of the drawings, the arrow "Fr" indicates the front, the arrow "Rr" indicates the rear, the arrow "IN" indicates the inner side in a right and left direction, and the arrow "OUT" indicates the outer side in the right and left direction.

Figure 1:
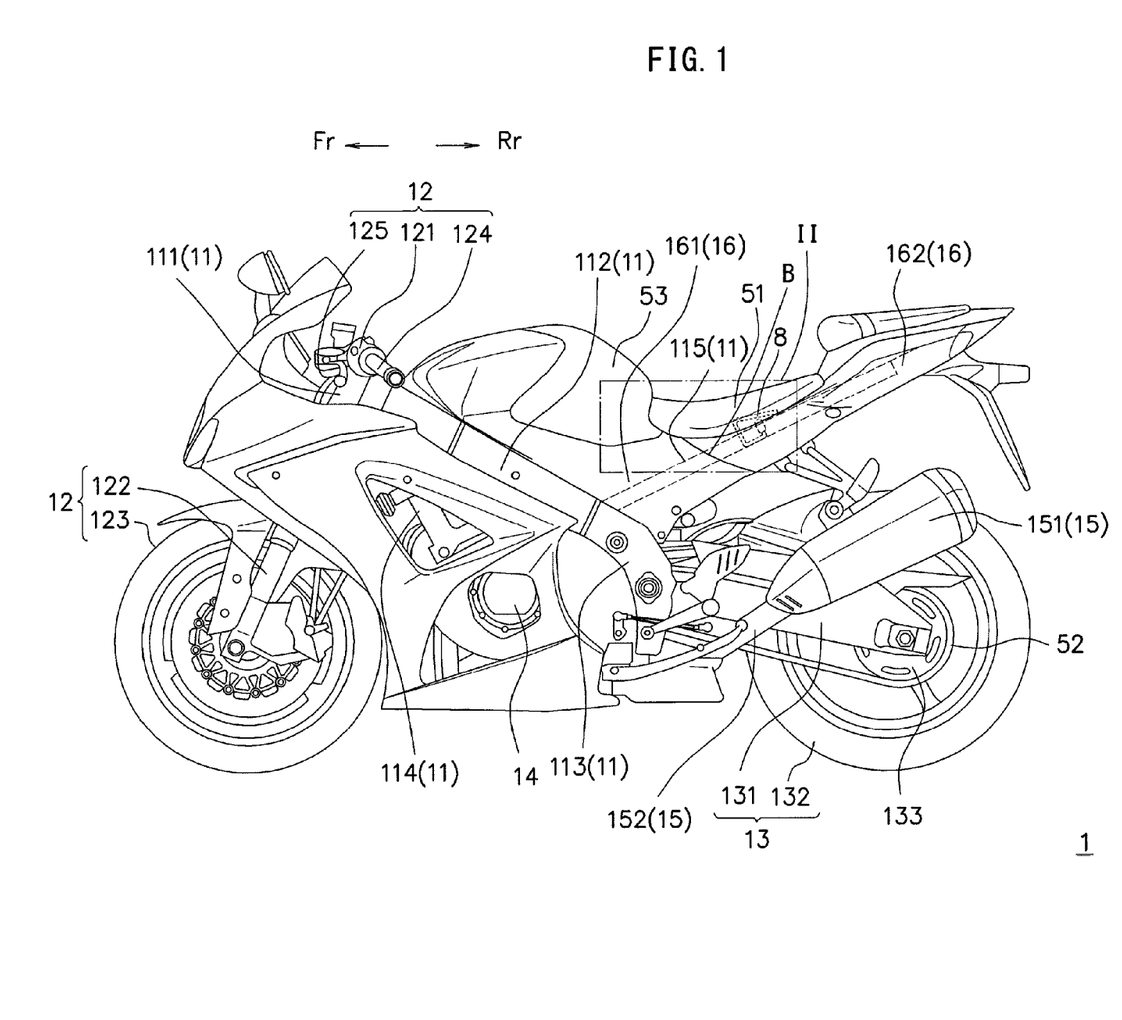
FIG. 1 is a side view of a motorcycle according to an embodiment of the present invention seen from the left.
Figure 2:
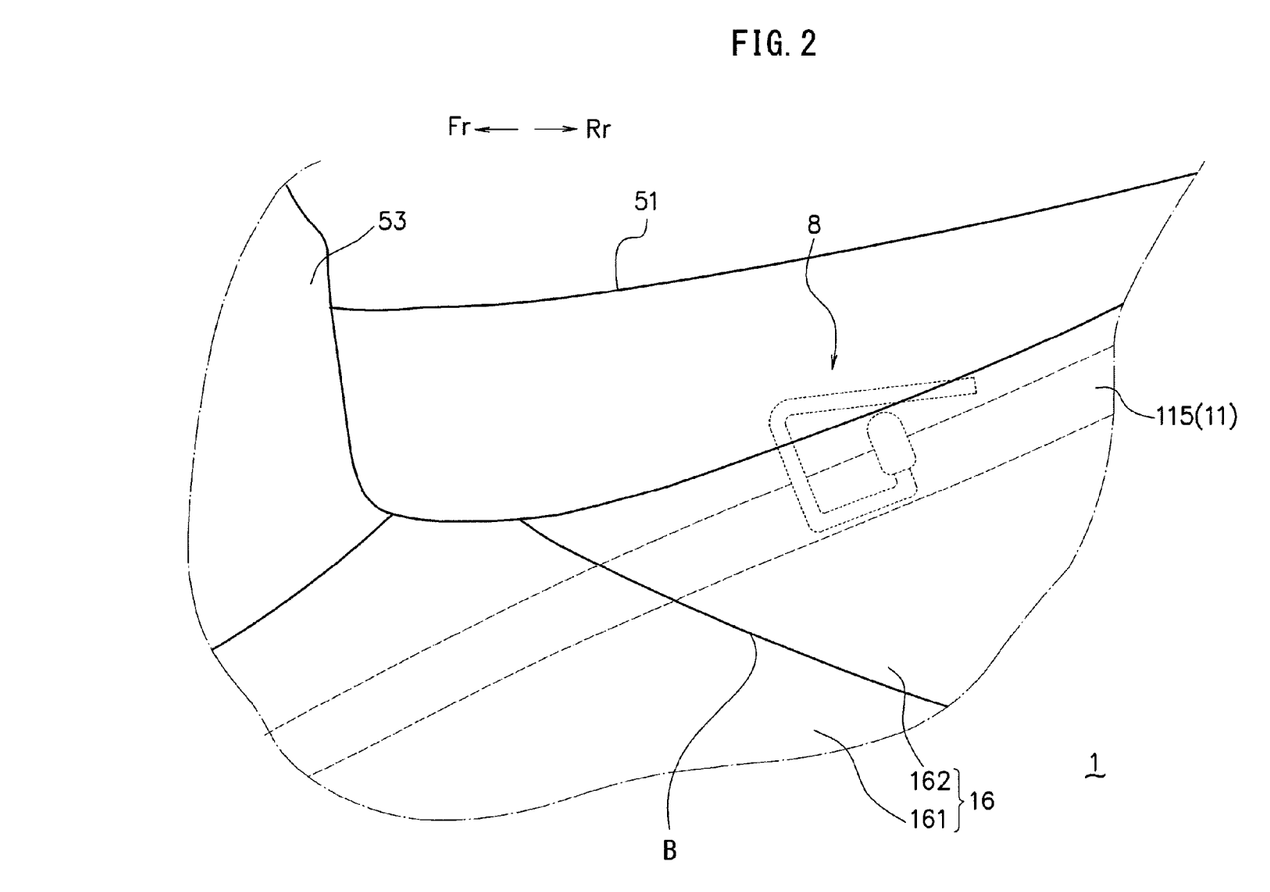
FIG. 2 is an enlarged view of the vicinity of a I I portion in FIG. 1, and is a view in which a portion where a helmet holder according to the embodiment of the present invention is provided is extracted to be illustrated.

First, an overall structure of the main motorcycle 1 will be explained with reference to FIG. 1 and FIG. 2. FIG. 1 is a side view of the main motorcycle 1 seen from the left. FIG. 2 is an enlarged view of the vicinity of a I I portion in FIG. 1, and is a view in which a portion where the main helmet holder 8 is provided is extracted to be illustrated. As illustrated in FIG. 1 and FIG. 2, the main motorcycle 1 includes: a vehicle body frame 11; a steering system 12; a rear wheel suspension system 13; an engine unit 14; an exhaust system 15; a frame cover 16; and other predetermined systems and members. Further, the main helmet holder 8 is provided on the main motorcycle 1.

The vehicle body frame 11 includes: a head pipe 111; a pair of right and left main tubes 112; pivot brackets 113; a down tube 114; and a seat rail 115. The head pipe 111 has a pipe-shaped part inclined rearward. The paired right and left main tubes 112 has a part extending obliquely rearward and rightward and a part extending obliquely rearward and leftward from the rear of the head pipe 111 respectively. The pivot brackets 113 are parts provided at the rear of the paired right and left main tubes 112. The down tube 114 has a part extending downward of the paired right and left main tubes 112 from the rear of the head pipe 111 and a part extending rearward from a lower end of the above part to be coupled to the pivot brackets 113. The seat rail 115 is provided on upper portions of the pivot brackets 113. The seat rail 115 is a member extending obliquely rearward and upward from the upper portions of the pivot brackets 113. Incidentally, the seat rail 115 is hidden behind the frame cover 16 (that will be explained later) and thus invisible from the outside, thus being illustrated by a dashed line.

A seating seat 51 is attachably and detachably attached to an upper side of the seat rail 115. At the rear of the seating seat 51 and the seat rail 115, a lock mechanism (its illustration is omitted) for fixing the seating seat 51 to the seat rail 115 is provided. Further, a fuel tank 53 is provided on an upper side of the main tubes 112.

The steering system 12 includes: a steering shaft (that is hidden and thus invisible in the drawing); a handle bar 121; a pair of right and left front forks 122; and a front wheel 123. Then, the steering system 12 is disposed at the front of the vehicle body frame 11 to be turnable with respect to the vehicle body frame 11. The steering shaft is turnably supported on the head pipe 111. The handle bar 121 is provided on an upper end of the steering shaft. The paired right and left front forks 122 are disposed to the right and left of the steering shaft respectively. The front wheel 123 is easily rotatably disposed on lower ends of the paired right and left front forks 122. The handle bar 121 has right and left handle grips 124. A throttle grip and a brake lever for the front wheel are provided on the right handle grip 124. A clutch lever 125 for operating a clutch is provided on the left handle grip 124.

The engine unit 14 is disposed in a space formed by the main tubes 112, the down tube 114, and the pivot brackets 113 of the vehicle body frame 11. The engine unit 14 includes: a cylinder assembly; and a crankcase assembly. In the cylinder assembly, a combustion chamber, an intake port supplying a fuel and air mixture to the combustion chamber, and an exhaust port discharging exhaust gas from the combustion chamber are provided. In the crankcase assembly, a crankshaft of an engine, a transmission, and the clutch are provided. At the left rear of the crankcase assembly, a left end of a driven shaft (that is hidden and thus invisible in FIG. 1) projects, and on the left end of the driven shaft, a drive chain sprocket (that is hidden and thus invisible in FIG. 1) is provided.

The rear wheel suspension system 13 includes: swing arms 131; a shock absorber (that is hidden and thus invisible in the drawing); and a rear wheel 132. The rear wheel suspension system 13 is provided at the rear of the pivot brackets 113 of the vehicle body frame 11, and has a front end thereof coupled to the pivot brackets 113 to be swingable in an up and down direction. The shock absorber is provided between the swing arms 131 and the pivot brackets 113, and absorbs and alleviates vibrations, shock and so on that transmit to the pivot brackets 113 from the swing arms 131. The rear wheel 132 is disposed at rear ends of the swing arms 131 and is easily rotatably supported by the swing arms 131. A driven chain sprocket 133 is provided on the left of the rear wheel 132. The rear wheel 132 and the driven chain sprocket 133 rotate integrally. Then, the drive chain sprocket of the engine unit 14 and the driven chain sprocket 133 of the rear wheel are coupled with a chain 52 so that rotary motive power can be transmitted.

The exhaust system 15 includes: a muffler 151 and an exhaust pipe 152. The muffler 151 is disposed at the rear of the engine unit 14 and lateral to the rear wheel 132. One end portion of the exhaust pipe 152 is connected to the exhaust port of the cylinder assembly in the engine unit 14. The other end portion of the exhaust pipe 152 is connected to the front of the muffler 151. Then, the exhaust pipe 152 extends forward from the front of the cylinder assembly in the engine unit 14 and curves rearward ahead of the cylinder assembly and passes through along the lateral side of the cylinder assembly or under the cylinder assembly to reach the front of the muffler 151.

The frame cover 16 is a member provided on lateral outer sides of the main motorcycle 1, and constitutes a design of appearance of the main motorcycle 1. As illustrated in FIG. 1, the frame cover 16 of the main motorcycle 1 is formed of a front frame cover 161 and a rear frame cover 162 as members different from each other and a plurality of separable and connectable cover members. The front frame cover 161 and the rear frame cover 162 are each made of, for example, a resin material, and formed integrally by injection molding or the like. The front frame cover 161 is provided from a portion under the fuel tank 53 to substantially the middle of the seating seat 51 in a front and rear direction. The rear frame cover 162 is provided from substantially the middle of the seating seat 51 in the front and rear direction to the rear of the main motorcycle 1. The front frame cover 161 and the rear frame cover 162 are attachably and detachably attached to the main tubes 112 and the seat rail 115 respectively and independently. In this manner, the front frame cover 161 and the rear frame cover 162 are separable from and connectable to each other. Then, the front frame cover 161 and the rear frame cover 162, when attached to the main tubes 112 and the seat rail 115 of the vehicle body frame 11, are coupled in substantially the middle of the seating seat 51 in the front and rear direction.

The main helmet holder 8 is provided on the seat rail 115 of the vehicle body frame 11. Concretely, the main helmet holder 8 is provided in the middle of the seating seat 51 in the front and rear direction, in the vicinity of a boundary of the front frame cover 161 and the rear frame cover 162 (the vicinity of a coupled portion B). In FIG. 1 and FIG. 2, a structure of the main helmet holder 8 being provided in the vicinity of the boundary of the front frame cover 161 and the rear frame cover 162 (the vicinity of the coupled portion B), in the vicinity of a front end of the rear frame cover 162 (namely, at the rear of the coupled portion B) is illustrated.

Incidentally, in a state of the seating seat 51 being attached to the main motorcycle 1, the main helmet holder 8 is covered with the seating seat 51 and the rear frame cover 162, and thus invisible from the outside.

Figure 3:
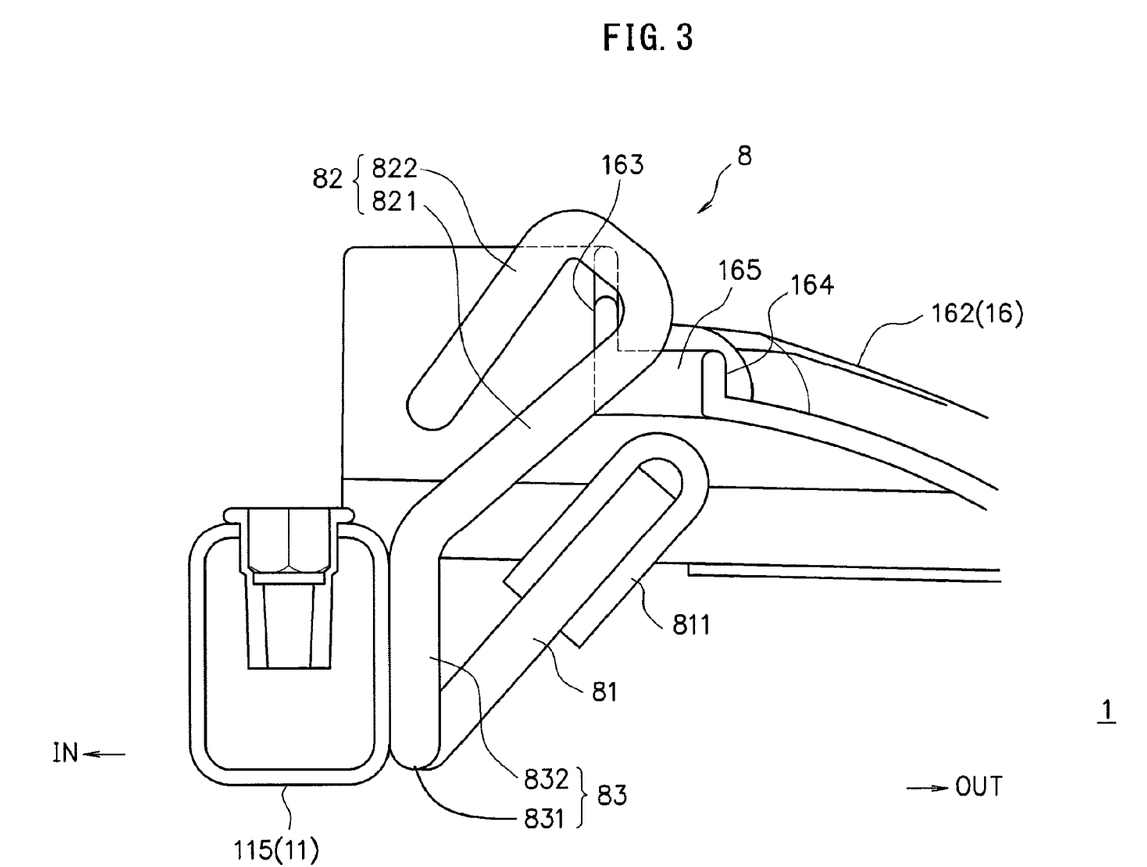
FIG. 3 is a cross-sectional view illustrating a relationship between a seat rail, a rear frame cover, and the helmet holder according to the embodiment of the present invention.

A structure of the seat rail 115 and the rear frame cover 162 in the vicinity of the main helmet holder 8 will be explained with reference to FIG. 3. FIG. 3 is a cross-sectional view illustrating a relationship between the seat rail 115, the rear frame cover 162, and the main helmet holder 8. As illustrated in FIG. 3, the rear frame cover 162 is provided on an outer side of the seat rail 115, apart from the seat rail 115. The rear frame cover 162 is a shell-shaped member, and is provided so as to cover a lateral outer side of the seat rail 115 from top to bottom obliquely. Ribs 163 and 164 standing upward are provided on an upper surface of the rear frame cover 162 along an inner edge. Upper ends of the ribs 163 and 164 are positioned higher than an upper surface of the seat rail 115. Consequently, when the main motorcycle 1 is seen from the side, the seat rail 115 is covered with the rear frame cover 162 and thus invisible. The ribs 163 and 164 engage with a lower surface of the seating seat 51. Consequently, when the seating seat 51 is attached to the main motorcycle 1, the seat rail 115 is covered with the seating seat 51 and the rear frame cover 162 and thus invisible from the outside.

Figure 4A:
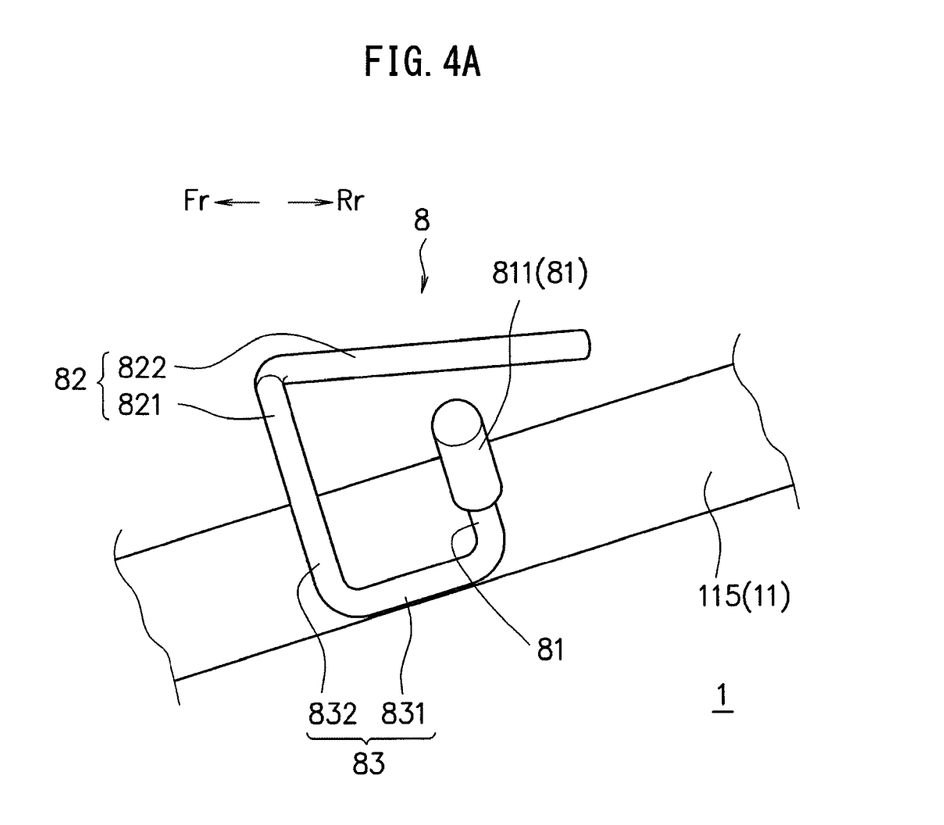
FIG. 4A is a side view, of the helmet holder according to the embodiment of the present invention seen from the left.
Figure 4B:
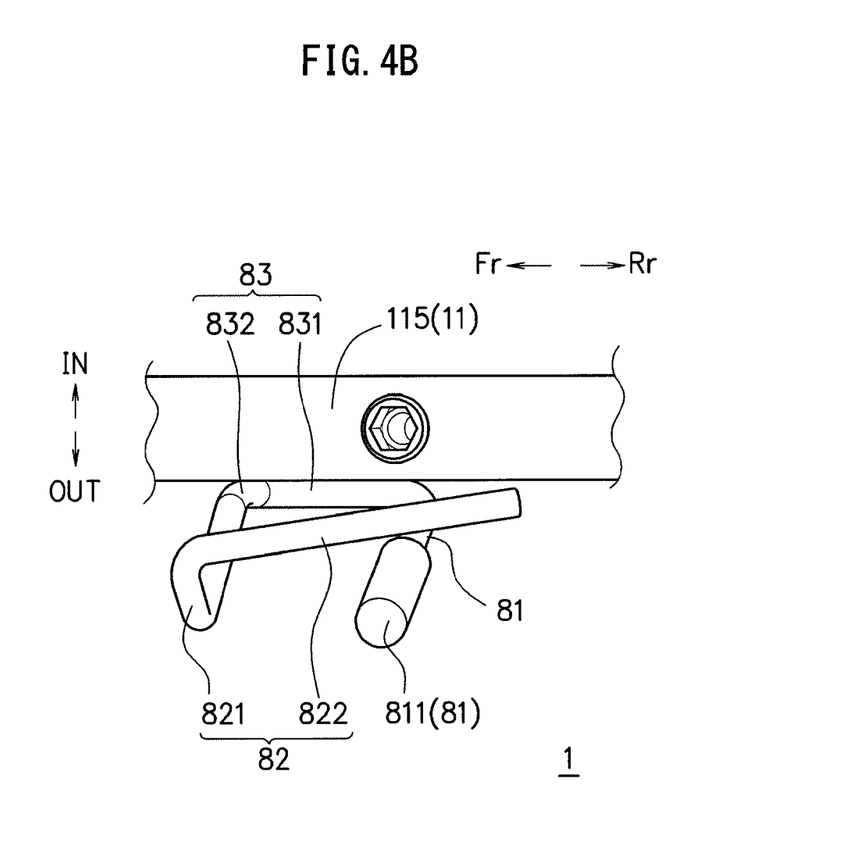
FIG. 4B is a plan view of the helmet holder according to the embodiment of the present invention seen from above.

Next, a structure of the main helmet holder 8 will be explained with reference to FIG. 3, FIG. 4A, and FIG. 4B. FIG. 4A is a side view of the main helmet holder 8 seen from the left. FIG. 4B is a plan view of the main helmet holder 8 seen from above. The main helmet holder 8 has a restriction part 81, a hook part 82, and a fixed part 83. Note that, in the following explanation, directions of the respective parts of the main helmet holder 8 are on the basis of the state of the main helmet holder 8 being attached to the seat rail 115.

The restriction part 81 is a part having a function restricting deformation of the rear frame cover 162. The restriction part 81 is provided in the vicinity of the hook part 82. The restriction part 81 is a part formed in a substantially bar shape or a projection shape, and projects toward an inner peripheral surface (the vicinity of an edge portion of an upper end, in particular) of the rear frame cover 162 from the seat rail 115. The rear frame cover 162 is provided at a position separated outward from the seat rail 115, and the inner edge portion of the rear frame cover 162 is positioned higher than an upper end of the seat rail 115. For this reason, the restriction part 81 projects obliquely outward and upward of the main motorcycle 1. Then, a tip of the restriction part 81 is positioned at an inner lower portion of the inner peripheral surface of the rear frame cover 162. A cushion material 811 is provided on a tip portion of the restriction part 81. The cushion material 811 is a member softer than the rear frame cover 162. For example, the cushion material 811 is formed of a soft resin material, rubber, or the like. Incidentally, the tip of the restriction part 81 (a tip of the cushion material 811 provided on the restriction part 81, exactly) and the inner peripheral surface of the rear frame cover 162 do not come into contact with each other, and are separated from each other at a predetermined space. The above space will be described later.

The fixed part 83 is a part bonded to the seat rail 115. The fixed part 83 has a first portion 831 and a second portion 832 that extend substantially perpendicularly to each other. The first portion 831 extends substantially forward (=obliquely forward and downward) from a base end portion of the restriction part 81 along an extending direction of the seat rail 115. The second portion 832 extends upward (=obliquely forward and upward) in a direction perpendicular to the extending direction of the seat rail 115 from a front end of the first portion 831. Consequently, the fixed part 83 has a substantially "L" shaped structure when seen from the side.

The hook part 82 has a hooking portion 821 and a guide portion 822. The hooking portion 821 is a portion to hook a hook ring 91 of a helmet. The hooking portion 821 is a curved or bent portion, and is formed such that the inside of an arc is directed toward the inner side of the main motorcycle 1. Concretely, the hooking portion 821 extends obliquely upward and outward from an upper end of the second portion 832 of the fixed part 83 and curves or bends in the middle in the up and down direction, and a portion of the hooking portion 821 higher than the curved or bent portion extends obliquely upward and inward. An upper end of the hooking portion 821 is positioned outward in a lateral direction rather than a lower end of the hooking portion 821 (see FIG. 4B, in particular). As above, the hooking portion 821 is formed so as to project toward the lateral outer side of the main motorcycle 1 from the seat rail 115. Incidentally, the hooking portion 821 may be structured to be curved into a substantially arc shape, or may also be structured to be bent into a substantially L shape. In brief, it is only necessary that the hooking portion 821 is structured to have the lower end thereof fixed to the seat rail 115 via the fixed part 83, and an intermediate portion between the lower end and the upper end is curved or bent so as to project laterally outward rather than the lower end and the upper end.

The guide portion 822 is a portion which the hook ring 91 of the helmet slides onto (a penetrable portion) when the hook ring 91 of the helmet is hooked on the main helmet holder 8. The guide portion 822 is formed in a substantially bar shape, and extends rearward from the upper end of the hooking portion 821. Incidentally, the guide portion 822 is inclined with respect to the extending direction of the seat rail 115 at a predetermined angle, and gradually approaches the seat rail 115 in the up and down direction and the right and left direction from its front end toward its rear end. Then, the rear end of the guide portion 822 is positioned obliquely on an upper outer side of the seat rail 115. The rear end of the guide portion 822 and the seat rail 115 are separated from each other, and a space allowing the hook ring 91 of the helmet to slide onto the guide portion 822 therethrough is formed.

As above, one end of the hook part 82 (=the lower end of the hooking portion 821) is fixed to the seat rail 115 via the fixed part 83. On the other hand, the other end of the hook part 82 (=the rear end of the guide portion 822) is separated from the seat rail 115. Then, a front end of the hook part 82 (=the front end of the guide portion 822 and the hooking portion 821) is positioned forward rather than the restriction part 81. On the other hand, a rear end of the hook part 82 (=the rear end of the guide portion 822) is positioned rearward rather than the restriction part 81. In other words, the restriction part 81 is provided at an intermediate position between the front end and the rear end of the hook part 82. Particularly, the restriction part 81 is provided at an intermediate position, of the guide portion 822, in a longitudinal direction (=substantially the front and rear direction).

The main helmet holder 8 is integrally formed by a single metal wire or metal bar. For example, the main helmet holder 8 is formed in a manner that a single metal wire or metal bar is subjected to bending. Then, the main helmet holder 8 is fixed to the seat rail 115 by the fixed part 83 being welded to the seat rail 115 or the like.

Figure 5:
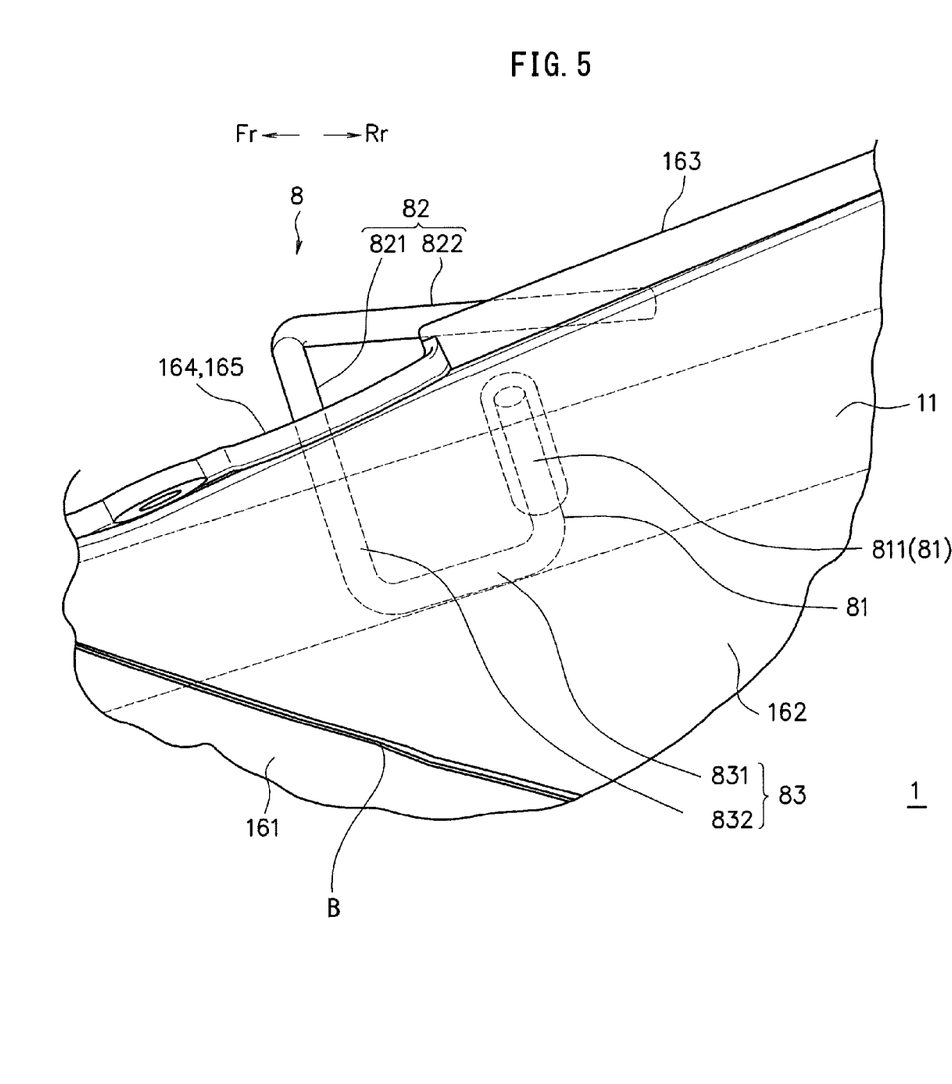
FIG. 5 is a side view illustrating a relationship between the helmet holder according to the embodiment of the present invention and the rear frame cover.

Next, a relationship between the main helmet holder 8 and the rear frame cover 162 will be explained with reference to FIG. 3 to FIG. 5. FIG. 5 is a side view illustrating the relationship between the main helmet holder 8 and the rear frame cover 162. As illustrated in FIG. 3 to FIG. 5, a front portion of the hook part 82 of the main helmet holder 8 (=an upper portion of the hooking portion 821 and a front portion of the guide portion 822) is positioned higher than the upper end of the rear frame cover 162. In contrast to this, a rear portion of the guide portion 822 is positioned lower than the upper end of the rear frame cover 162. Further, in the rear frame cover 162, a recessed portion 165 having a structure such that the rear frame cover 162 is cut out outward is formed at a position corresponding to the hooking portion 821. Then, the upper portion of the hooking portion 821 of the main helmet holder 8 projects upward of the rear frame cover 162 through the above recessed portion 165. Note that the height of the rib 164 formed on the recessed portion 165 is lower than that of the rib 163 formed on the different portion (particularly, the rib formed at the position corresponding to the rear end of the guide portion 822).

A relationship between the restriction part 81 of the main helmet holder 8 and the rear frame cover 162 will be explained with reference to FIG. 3. A space with a predetermined size is formed between the tip of the restriction part 81 of the main helmet holder 8 and the inner peripheral surface of the rear frame cover 162. As a result, when the rear frame cover 162 is pressed inward from the outside, the rear frame cover 162 is deformed and the upper end of the rear frame cover 162 moves downward. When the deformation is large, the inner peripheral surface of the rear frame cover 162 comes into contact with the tip of the restriction part 81 of the main helmet holder 8. However, the rear frame cover 162 is not allowed to be deformed any further when the inner peripheral surface of the rear frame cover 162 comes into contact with the tip of the restriction part 81 of the main helmet holder 8. Then, the size of the space is set to a size such that even though the rear frame cover 162 is deformed and the inner peripheral surface of the rear frame cover 162 comes into contact with the tip of the restriction part 81 of the main helmet holder 8, the upper end of the rear frame cover 162 is prevented from being positioned lower than the rear end of the guide portion 822. As above, the restriction part 81 of the main helmet holder 8 restricts deformation of the rear frame cover 162 to prevent the upper end of the rear frame cover 162 from reaching a position lower than the rear end of the guide portion 822.

Figure 6:
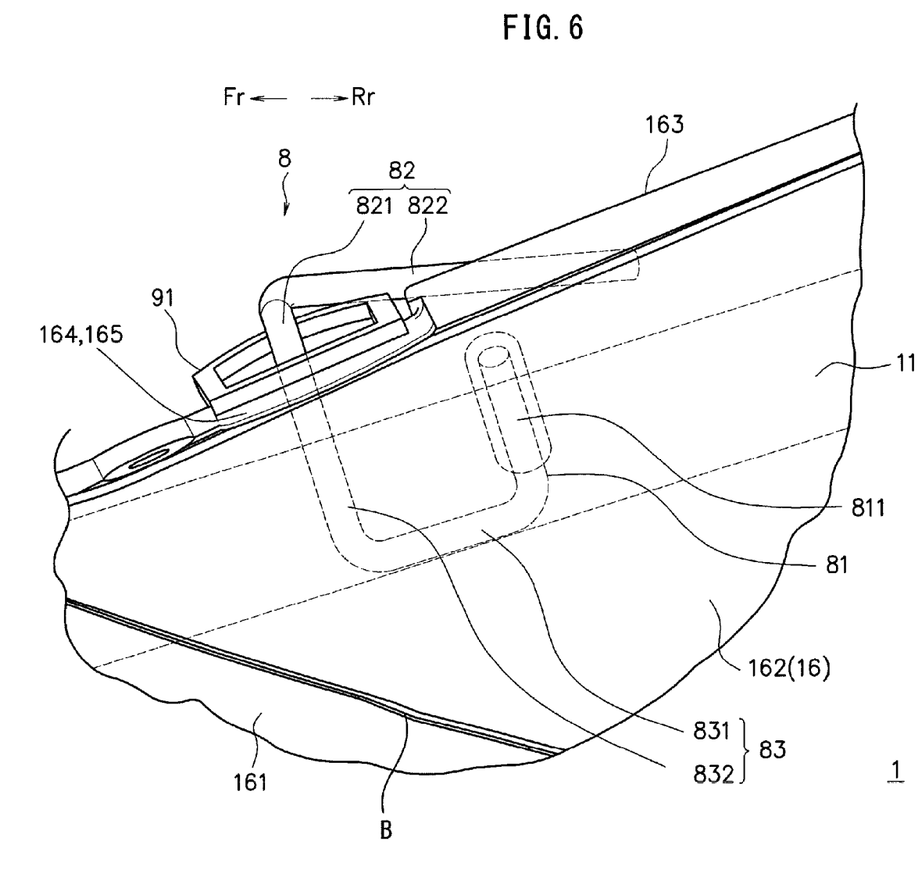
FIG. 6 is a side view illustrating a state of a hook ring of a helmet being hooked on the helmet holder according to the embodiment of the present invention, and is a view seen from the side.
Figure 7:
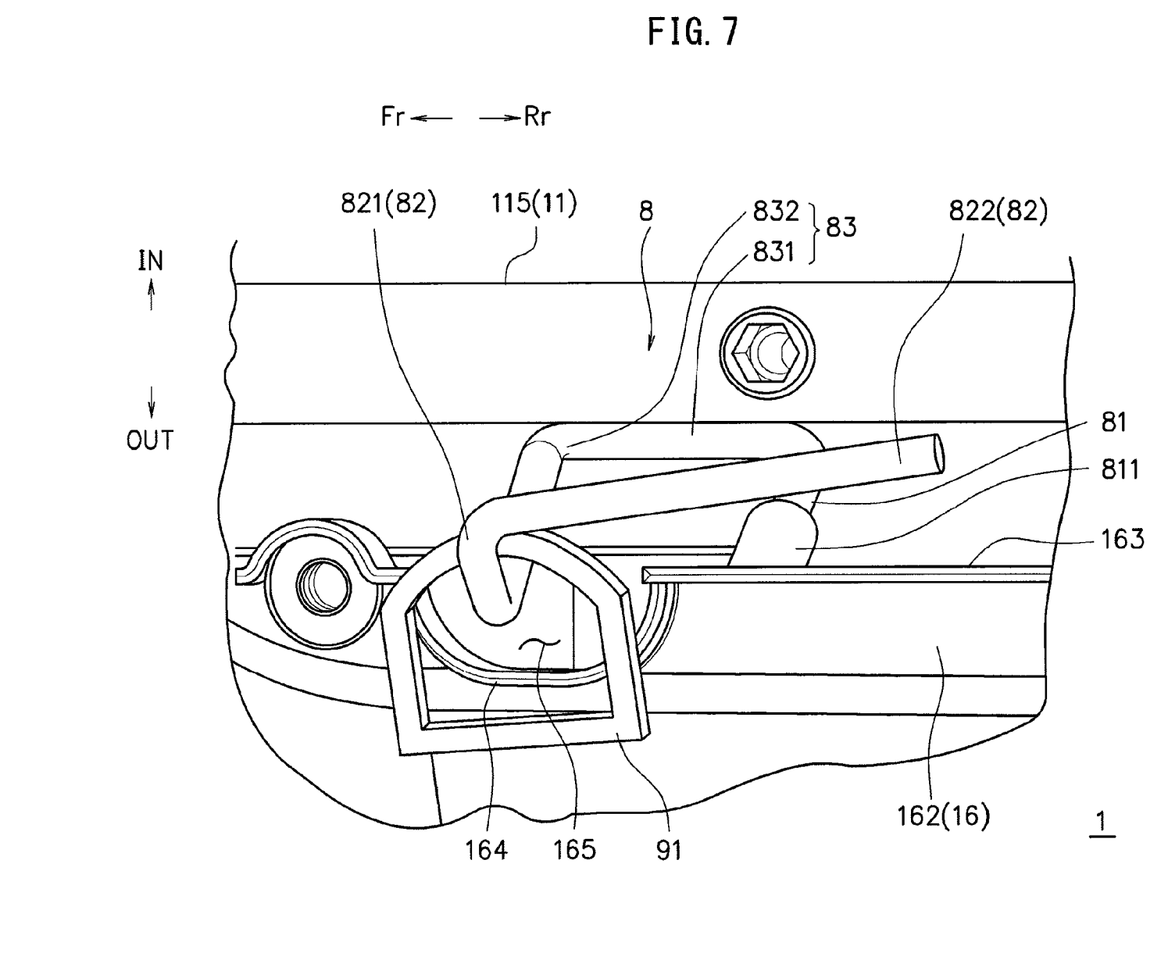
FIG. 7 is a plan view illustrating the state of the hook ring of the helmet being hooked on the helmet holder according to the embodiment of the present invention, and is a view seen from above.
Figure 8:
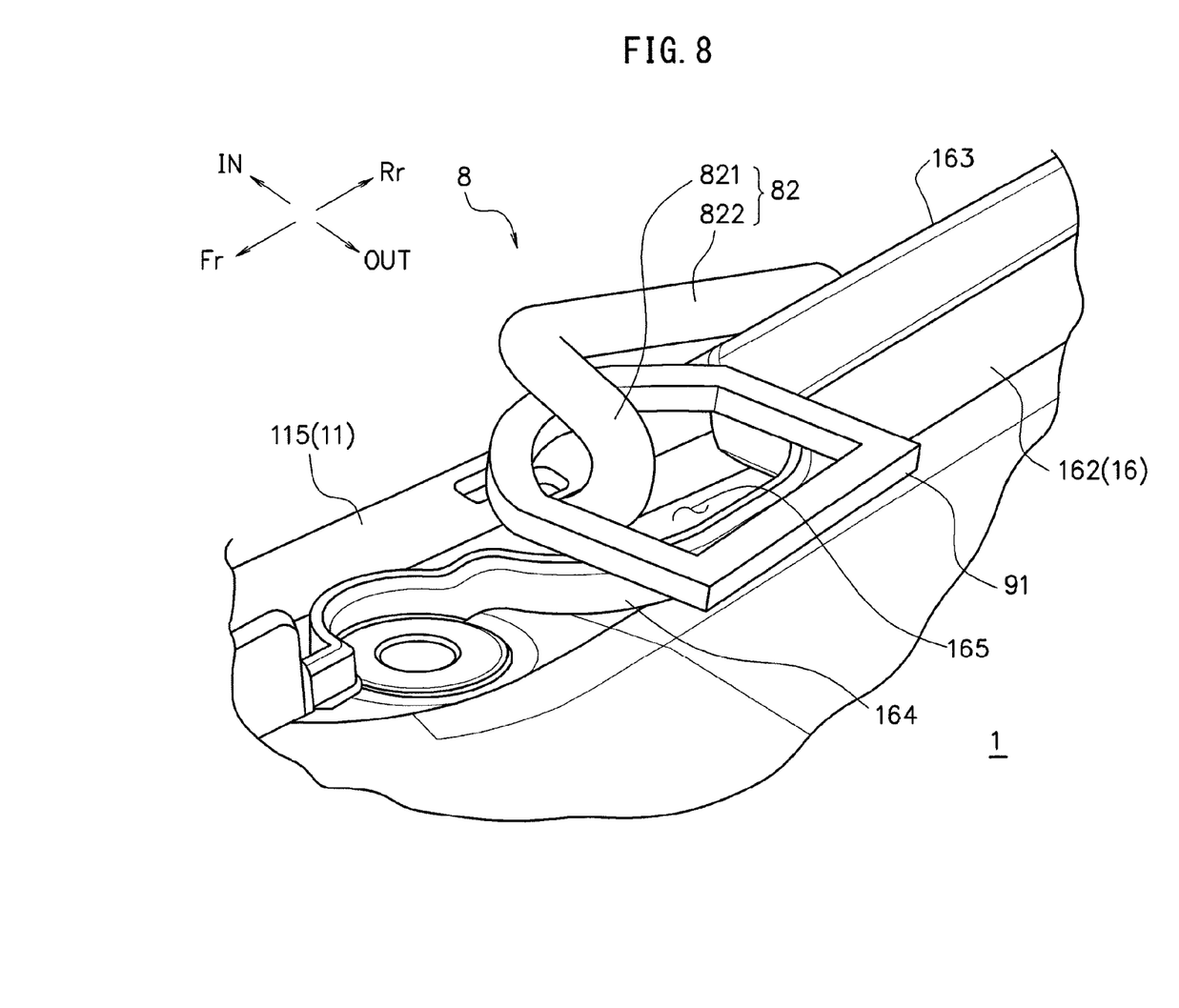
FIG. 8 is a perspective view illustrating the state of the hook ring of the helmet being hooked on the helmet holder according to the embodiment of the present invention, and is a view seen obliquely from the front top.

Next, a way of using the main helmet holder 8 and a state of the main helmet holder 8 being used will be explained with reference to FIG. 6 to FIG. 8. FIG. 6 to FIG. 8 are views each illustrating a state of the hook ring 91 of the helmet being hooked on the main helmet holder 8, and FIG. 6 is a side view of the state being seen from the side, FIG. 7 is a plan view of the state being seen from above, and FIG. 8 is a perspective view of the state being seen obliquely from the front top.

When the seating seat 51 is detached from the main motorcycle 1, the main helmet holder 8 and the vicinity of the main helmet holder 8 are exposed. Then, a user slides the hook ring 91 of the helmet onto the rear end of the guide portion 822 and moves it forward to the hooking portion 821. In this state, the user attaches the seating seat 51 to the seat rail 115 to fix the seating seat 51 to the seat rail 115 by using the lock mechanism. In that case, the main helmet holder 8 is covered with the seating seat 51 and the frame cover 16 and is not exposed (see FIG. 2).

As illustrated in FIG. 6 to FIG. 8, one portion of the hook part 82 of the main helmet holder 8 (=the upper portion of the hooking portion 821 and the front portion of the guide portion 822) projects upward from the upper surface of the rear frame cover 162. As a result, the hook ring 91 of the helmet hooked on the hook part 82 of the main helmet holder 8 is brought into a lying posture along the upper surface of the rear frame cover 162. Thus, in the state of the seating seat 51 being attached to the seat rail 115, the hook ring 91 of the helmet and the seating seat 51 do not interfere with each other. Further, the hooking portion 821 of the hook part 82 of the main helmet holder 8 projects outward. Then, the hooking portion 821 gets into the recessed portion 165 provided in the rear frame cover 162. As a result, the hook ring 91 of the helmet hooked on the hooking portion 821 is at the position separated outward from the seat rail 115. Further, the height of the rib 164 formed on an inner peripheral edge of the recessed portion 165 of the rear frame cover 162 is lower than that of the rib 163 formed on the different portion. Then, the hook ring 91 of the helmet, when hooked on the hooking portion 821 of the hook part 82 of the main helmet holder 8, goes over the rib 164 on the recessed portion 165 to be placed on the upper surface of the rear frame cover 162. Thus, when the seating seat 51 is attached to the seat rail 115, the hook ring 91 of the helmet does not interfere with the seating seat 51 and the seat rail 115. Consequently, the seating seat 51 can be attached to the seat rail 115 smoothly.

Operations and effects of the main helmet holder 8 are as follows. First, the operations and effects will be explained with reference to FIG. 3. When the rear frame cover 162 is pressed from the outside to be deformed, the inner peripheral surface of the rear frame cover 162 comes into contact with the restriction part 81 of the main helmet holder 8. In that case, the deformation of the rear frame cover 162 is restricted by the restriction part 81 and the rear frame cover 162 is not allowed to be deformed inward any further. Then, even though the inner peripheral surface of the rear frame cover 162 comes into contact with the restriction part 81, the upper end of the rib 163 of the rear frame cover 162 is not displaced to the side lower than the rear end of the guide portion 822 of the main helmet holder 8. That is, the rear end of the guide portion 822 of the main helmet holder 8 does not project upward higher than the upper end of the rear frame cover 162. Thus, the hook ring 91 of the helmet is prevented from coming off from the rear end of the guide portion 822.

In a state where external force is not applied to the rear frame cover 162, the tip of the restriction part 81 does not come into contact with the inner peripheral surface of the rear frame cover 162. Consequently, it is possible to prevent the rear frame cover 162 and the tip of the restriction part 81 from being abraded and damaged. Further, even though the tip of the restriction part 81 comes into contact with the inner peripheral surface of the rear frame cover 162 by vibrations at the time of driving, deformation at the time of riding on the main motorcycle 1, or the like, abrasion and damage of the rear frame cover 162 and the restriction part 81 can be prevented because the cushion material 811 is provided on the tip of the restriction part 81.

Next, the operations and effects of the main helmet holder 8 will be explained with reference to FIG. 4A and FIG. 4B. The restriction part 81 of the main helmet holder 8 is provided on the seat rail 115, in the vicinity of the hook part 82 and at the intermediate position between the front end and the rear end of the hook part 82. Concretely, the restriction part 81 of the main helmet holder 8 is provided at the intermediate position, of the guide portion 822 of the hook part 82, in the longitudinal direction. As a result, the hook ring 91 of the helmet is required to pass through the vicinity of the restriction part 81 in order to take the hook ring 91 of the helmet out from the hook part 82. Then, deformation of the rear frame cover 162 is restricted by the restriction part 81, so that a space allowing the hook ring 91 of the helmet to pass through is prevented from being made between the seating seat 51 and the upper end of the rear frame cover 162. Consequently, it is possible to prevent that the hook ring 91 of the helmet passes through the vicinity of the restriction part 81 to come off from the rear end of the guide portion 822.

Further, the guide portion 822 is inclined with respect to the seat rail 115, and from the front end of the guide portion 822 (=the upper end of the hooking portion 821) toward the rear end of the guide portion 822, the guide portion 822 comes close to the seat rail 115 and goes away from the inner peripheral surface of the rear frame cover 162. Consequently, it is necessary to move the hook ring 91 of the helmet inward from the rear frame cover 162, in order to pull the hook ring 91 of the helmet out of the guide portion 822. Thus, for example, as compared to a structure in which the guide portion 822 is parallel to a surface of the seat rail 115 or the inner peripheral surface of the rear frame cover 162, it becomes difficult for the hook ring 91 of the helmet to come off.

The main helmet holder 8 is made of a single metal wire material or metal bar material, and is formed by bending or the like. Consequently, it is possible to prevent an increase in number of parts. Then, since the increase in number of parts can be prevented, it is possible to achieve a reduction in man-hours of a work in which the main helmet holder 8 is attached to the seat rail 115. Further, since a simple metal wire or metal bar can be applied as the material of the main helmet holder 8, it is possible to achieve a reduction in part cost. Then, since the fixed part 83 is formed in a substantially L shape, when the fixed part 83 is provided on a side surface of the seat rail 115, the direction in which the restriction part 81 projects, an angle between the guide portion 822 and the seat rail 115, and a relative positional relationship are defined by themselves. Consequently, an assembling work of the main helmet holder 8 is facilitated.

Even in the structure in which the frame cover 16 is formed of the front frame cover 161 and the rear frame cover 162 independent respectively, it is possible to restrict deformation of the frame cover 16 to prevent a space from being made between the seating seat 51 and the frame cover 16. That is, in a motorcycle to which a conventional helmet holder is applied, it is necessary to prevent deformation by increasing strength of a frame cover in the vicinity of the helmet holder. As a result, there has been used a structure in which the frame cover is formed integrally (is formed of a single member) to increase its strength. However, in the structure of the frame cover being molded integrally, a molding mold used for molding the frame cover is increased in size, so that facility cost is increased. Further, there is a problem that the degree of freedom of a design of the frame cover is low. In contrast to this, according to the main motorcycle 1 to which the main helmet holder 8 is applied, it is structured that deformation of the frame cover 16 is restricted by the restriction part 81, so that it is not necessary to integrally mold the frame cover 16, in order to achieve an improvement of strength of the frame cover 16. Then, when the frame cover 16 is structured to be formed of the front frame cover 161 and the rear frame cover 162 as a plurality of cover members independent respectively, for example, a reduction in size of a molding mold used for molding the frame cover 16 can be achieved. Consequently, a reduction in facility cost can be achieved. Further, the front frame cover 161 and the rear frame cover 162 can be formed separately, so that the degree of freedom of the design of the frame cover 16 is improved.

In the foregoing, the embodiment of the present invention has been explained in detail, but the embodiment merely illustrates a concrete example of implementing the present invention. The technical scope of the present invention is not limited to the embodiment. The present invention may be implemented in various forms without departing from the spirit of the present invention, and these are also included in the technical scope of the present invention.

For example, in the above-described embodiment, the structure of the main helmet holder being provided on the seat rail has been described, but the member on which the main helmet holder is provided is not limited. A structure of the main helmet holder being provided on the main tube or pivot bracket of the vehicle body frame may also be applied. Further, in the above-described embodiment, the structure of the main helmet holder being provided on the left of the main motorcycle has been described, but a structure of the main helmet holder being provided on the right of the main motorcycle may also be applied. Further, the number of the main helmet holders is not limited, and a structure of the two main helmet holders for a driver and a pillion passenger being provided may also be applied. In the above case, a structure of the two main helmet holders being provided on either the right or left of the main motorcycle may be applied, or a structure of the two main helmet holders being provided on both the right and left of the main motorcycle respectively may also be applied.

Further, in the above-described embodiment, the hook part and the restriction part of the main helmet holder are formed integrally, but may also be members independent respectively to be provided on the vehicle body frame separately.

Further, in the above-described embodiment, the structure of the frame cover being formed of the two cover members of the front frame cover and the rear frame cover has been described, but the number of the cover members forming the frame cover is not limited. For example, a structure of the frame cover of the main motorcycle being formed of three or more of cover members independent respectively may also be applied.

According to the saddle type vehicle of the present invention, the restriction part restricts deformation of the frame cover. Consequently, it is possible to prevent a space allowing the hook ring of the helmet to be pulled out therethrough from being made in the vicinity of the hook part. Accordingly, it is possible to prevent the hook ring of the helmet from coming off from the helmet holder. Particularly, when the restriction part is structured to be provided at the intermediate position between the one end and the other end of the hook part, deformation of the frame cover at the position corresponding to the hook part is restricted. Then, it is possible to prevent a space allowing the hook ring of the helmet to pass through from being made between the seating seat and the frame cover.

Further, it is possible to apply the structure in which the hook part has the hooking portion hooking and holding the hook ring of the helmet and the guide portion extending from the hooking portion and the restriction part is provided at the intermediate position, of the hooking portion, in the longitudinal direction. When such a structure is applied, along a route where the hook ring of the helmet is moved from the hooking portion to an end portion of the guide portion, deformation of the frame cover can be restricted. Accordingly, it is possible to prevent that the hook ring of the helmet hooked and held on the hooking portion slides onto the guide portion to come off.

The restriction part and the hook part are each made of a single metal wire or metal bar, and are formed by bending. Consequently, it is possible to prevent an increase in number of parts. Then, since the increase in number of parts can be prevented, it is possible to achieve a reduction in man-hours of the work in which the restriction part and the hook part are attached to the vehicle body frame. Further, since a simple metal wire or metal bar can be applied as the material of the restriction part and the hook part, it is possible to achieve a reduction in part cost.

A space is formed between the tip of the restriction part and the inner peripheral surface of the frame cover. Consequently, it is possible to prevent the frame cover and the tip of the restriction part from being abraded and damaged. Then, when the structure of the cushion material being provided on the tip of the restriction part is applied, abrasion and damage of the frame cover and the restriction part can be prevented even though the tip of the restriction part comes into contact with the inner peripheral surface of the frame cover by vibrations at the time of driving, deformation at the time of riding on the main motorcycle, or the like.

The present invention has the structure of the restriction part restricting deformation of the frame cover, so that it is not necessary to provide a structure for preventing or suppressing deformation on the frame cover itself. Consequently, it is possible to prevent complication of the structure of the frame cover and an increase in weight. Accordingly, it is possible to prevent an increase in manufacturing cost of the frame cover. Further, as conventionally needed, the structure in which the frame cover is molded integrally, thereby making the frame cover difficult to be deformed is not needed any more, so that the frame cover can be divided into a plurality of frame covers (can be formed of a plurality of members). That is, in a saddle type vehicle to which a conventional helmet holder is applied, it is necessary to prevent deformation by increasing strength of the frame cover in the vicinity of the helmet holder. As a result, the structure in which the frame cover is molded integrally to thereby increase its strength has been used. However, in the structure of the frame cover being molded integrally, a molding mold used for molding is increased in size to thus increase facility cost. Further, there is a problem that the degree of freedom of a design of the frame cover is low. In contrast to this, when the structure in which the frame cover can be molded by being divided into a plurality of frame covers is applied, a reduction in size of a molding mold used for molding the frame cover can be achieved. Consequently, a reduction in facility cost can be achieved. Further, a plurality of the frame covers can be formed separately, so that the degree of freedom of the design of the frame cover is improved.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

The present invention is a technique effective for a saddle type vehicle having a helmet holder. As the saddle type vehicle, besides a motorcycle, various saddle type vehicles such as a motorized bicycle, a handle bar type electric wheelchair (what is called a mobility scooter), and a two-wheeled vehicle and a three-wheeled vehicle for off road driving are applicable.

What is claimed is:

1. A saddle vehicle comprising:
a vehicle body frame;
a frame cover provided on an outer side of said vehicle body frame;
a hook part that is provided on said vehicle body frame and on which a hook ring provided on a helmet is allowed to be hooked and held; and
a restriction part provided in a vicinity of said hook part on said vehicle body frame and projecting toward an inner peripheral surface of said frame cover to restrict deformation of said frame cover.

2. The saddle vehicle according to claim 1, wherein
one end of said hook part is fixed to said vehicle body frame and the other end of said hook part is separated from said vehicle body frame, and
said restriction part is provided at an intermediate position between the one end and the other end of said hook part.

3. The saddle vehicle according to claim 2, wherein
said frame cover is formed of a plurality of separable and connectable cover members, and said restriction part is provided in another vicinity of a coupled portion of the cover members connected to each other.

4. The saddle vehicle according to claim 3, wherein
said hook part includes: a hooking portion on which the hook ring is allowed to be hooked and held; and a substantially bar-shaped guide portion that extends from the hooking portion and is capable of being inserted into the hook ring, and
said restriction part is provided at an intermediate position, of the guide portion, in a longitudinal direction.

5. The saddle vehicle according to claim 4, wherein
said hook part and said restriction part are formed integrally by a metal wire material or metal bar material to be provided on said vehicle body frame.

6. The saddle vehicle according to claim 5, wherein
a space is formed between a tip of said restriction part and the inner peripheral surface of said frame cover.

7. The saddle vehicle according to claim 6, wherein
a cushion material is provided on a tip of said restriction part.

8. The saddle vehicle according to claim 2, wherein
said hook part includes: a hooking portion on which the hook ring is allowed to be hooked and held; and a substantially bar-shaped guide portion that extends from the hooking portion and is capable of being inserted into the hook ring, and
said restriction part is provided at an intermediate position, of the guide portion, in a longitudinal direction.

9. The saddle vehicle according to claim 8, wherein
said hook part and said restriction part are formed integrally by a metal wire material or metal bar material to be provided on said vehicle body frame.

10. The saddle vehicle according to claim 9, wherein
a space is formed between a tip of said restriction part and the inner peripheral surface of said frame cover.

11. The saddle vehicle according to claim 10, wherein
a cushion material is provided on a tip of said restriction part.

* * * * *